United States Patent
Bensemana

(10) Patent No.: US 8,266,048 B2
(45) Date of Patent: *Sep. 11, 2012

(54) SYSTEM AND METHOD FOR ANONYMOUSLY MATCHING PRODUCTS OR SERVICES WITH A CONSUMER

(75) Inventor: Laurent Bensemana, Hampstead (CA)

(73) Assignee: NDEX Systems Inc., Montreal (Quebec) (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/406,806

(22) Filed: Feb. 28, 2012

(65) Prior Publication Data

US 2012/0191564 A1    Jul. 26, 2012

Related U.S. Application Data

(63) Continuation of application No. 09/845,814, filed on Apr. 30, 2001.

(60) Provisional application No. 60/200,880, filed on May 1, 2000.

(51) Int. Cl.
*G06Q 40/00* (2012.01)
(52) U.S. Cl. ................................. 705/37; 705/14.1
(58) Field of Classification Search ............ 705/37, 705/7.39, 14.1, 14.45, 14.66
See application file for complete search history.

(56) References Cited

U.S. PATENT DOCUMENTS

| | | | |
|---|---|---|---|
| 4,908,761 A | 3/1990 | Tai | |
| 5,704,017 A | 12/1997 | Heckerman et al. | |
| 5,734,720 A | 3/1998 | Salganicoff | |
| 5,758,259 A | 5/1998 | Lawler | |
| 5,794,210 A | 8/1998 | Goldhaber et al. | |
| 5,826,164 A | 10/1998 | Weinblatt | |
| 5,854,923 A | 12/1998 | Dockter et al. | |
| 5,855,008 A * | 12/1998 | Goldhaber et al. | 705/14.1 |
| 5,915,243 A | 6/1999 | Smolen | |
| 5,918,017 A | 6/1999 | Attanasio et al. | |
| 5,918,217 A | 6/1999 | Maggioncalda et al. | |
| 5,920,848 A | 7/1999 | Schutzer et al. | |
| 5,945,988 A | 8/1999 | Williams et al. | |
| 5,973,683 A | 10/1999 | Cragun et al. | |
| 5,999,908 A | 12/1999 | Abelow | |
| 6,012,046 A * | 1/2000 | Lupien et al. | 705/36 R |
| 6,298,348 B1 | 10/2001 | Eldering | |

* cited by examiner

*Primary Examiner* — Hani M Kazimi
(74) *Attorney, Agent, or Firm* — Fish & Richardson P.C.

(57) ABSTRACT

A system and method for anonymously matching products or services with a consumer, based on the consumer's true consumption behavior. Each consumer is represented by a unique true behavior derived consumption profile, and a private repository of such true consumption profiles is provided where each profile is anonymous. A repository of consumption objects such as vendors' products and services is also provided. The system correlates parameters of the consumer's true consumption profile with parameters of the consumption object's profiles to find the best matches and presents the consumer's with a list of best to worst matches for a desired products. At all time the consumer's true identity remains confidential, alleviating the privacy concerns of a lot a consumers.

1 Claim, 8 Drawing Sheets

SYSTEM AND METHOD FOR ANONYMOUSLY MATCHING PRODUCTS OR SERVICES WITH A CONSUMER

FIELD OF THE INVENTION

The present invention relates to a system and method for anonymously matching products or services with a consumer.

DESCRIPTION OF THE PRIOR ART

In the field of customer fidelity, a number of techniques have been proposed to target specific products and/or services to a customer. The vast majority of these techniques are based on one of two fundamental approaches: tracking, in one-way or another, the behaviour of the person, or simply asking the person for preferences, and using that information to derive a profile.

Alternatively, some techniques have been proposed to attempt to predict which item within a list would best suit a customers needs, based on prior historical data.

Although these techniques have met with relative success, they limit their focus on trying to predict which item is best for the customer, as based on data obtained by the tracking of the customers past consumption habits or the stated consumption habits as outlined by the customer himself.

It is believed however that the value in the resulting predictions as derived via the above stated process would be greatly increased, if the search result would further look to determine a more basic question, such as "is the resulting selected item "truly" the one sought out/needed by the customer"—i.e. to not simply limit the inference to, "which option within a list is best?", but rather to identify, correlate and weight the similarities and differences existing between the stated perceived "wants" of the customer with the actual observed "needs" of that same customer, so as to determine, "which option within a list is best for that particular and unique customer?"

The present application describes a system which is particularly suited for the providers of goods and services operating in a market environment that is increasingly concerned with privacy issues relating to consumer demographic and consumption information and its use and disclosure thereof.

In ever increasing instances, the provider of goods and services may:

i) not have the consent of his clients, current and/or potential, to capitalise on their personal consumption behaviour profile in order to determine and present them with a potentially suited product or service;

ii) encounter legal constraints in disclosing customer information to interested third party vendors;

iii) be, in certain industry sectors or geographical areas, legally constrained when looking to capitalise on internally held customer information for the purpose of cross-marketing and/or cross-selling:

iv) possibly encounter the most damaging of customer-relations occurrences, that of customers being angered as a result of a vendor having disclosed information pertinent to the customers' consumption profiles.

SUMMARY OF THE INVENTION

The present invention concerns a system and method by which a consumer may investigate and consequently identify the ideally suited goods or services, all the while remaining entirely anonymous to the inquisitive marketing research focus of his potential suppliers. Furthermore, in recognition of the importance and commercial value of R&D and marketing, a central yet fully anonymous database, comprised of the true consumption profiles of all contributing consumers, can be maintained in order to support vendors of goods and services in their product development and marketing research functions, i.e. a tool enabling vendors to build to specifications not as per their marketing department, but rather as per their target customer's true consumption profiles.

A fundamental aspect of the present invention is that the identity of the consumer remains private. It is the consumer's profile that executes an investigation within a centralised product database (hereinafter referred to as "product repository") containing the profiles of the goods and services potentially suited to meet the true "needs" and "wants" of the consumer. Consequently, a single potential offering, or a list of potential offerings, best meeting the consumer's requirements can be presented to the consumer. In a sense, this is the creation of an electronic "Consumer Guide" as referenced to the consumer's true consumption behaviour profile.

In accordance with the invention, these and other objects are achieved with a system for anonymously matching consumption objects with a consumer consumption behaviour, said consumer being uniquely identified by a true behaviour derived consumption profile, said system comprising:

a central and private consumer repository containing a plurality of true consumption profiles corresponding to a plurality of consumers, each of said true consumption profiles being anonymous;

a central product repository, containing consumption object profiles for a plurality of consumption objects;

correlating means for correlating parameters of a potential target consumption object with parameters of a given consumer's true consumption profile, and identifying at least one best matched consumption object; and means for confidentially presenting said consumer with the profile of said at least one best-matched consumption object.

It is understood that the term "consumption object" is used herein to design any product or service that may be available to the customer.

The present invention therefore provides a central repository of a plurality of consumer's true behaviour derived consumption profiles, characterised in that each of said profiles is anonymously entered into said repository, so that accessing said repository provides no information with respect to a particular consumer.

The method according to the present invention comprises the following steps:

(a) creating a central repository of consumer's true consumption profiles;

(b) creating a central repository for industry participants to register the profile of their products and services;

(c) searching the product repository for a "best" suited match as per an alignment with the requisite product/service parameters and that of the consumer's True consumption profile parameters;

(d) presenting the consumer with a search-results list of "best" to "least best" match, and weighting as per;

(e) continuously and independently surveying the product/service repository(ies) for the identification of potential yet unspecified, neither yet unsought consumption opportunities. (all the while allowing the potential suited consumer to remain anonymous) i.e. an electronic consumption agent/consumption butler.

In another aspect of the present invention, given that "market research" is the primary method on which providers of goods and services rely on in order to develop new and better suited offerings, the central yet fully private repository of consumer's true consumption profiles can be made accessible to vendors in order to support them in their market research, and consequently influence product development. Vendors would be able to query this secure and fully confidential consumer true consumption behaviour profile database in order to determine what possible product and service designs would be most appealing to their potential target market. It is essential to note that the concerned product vendors would have no ability of determining which consumers had contributed to either the database or to the query result(s) itself. All contributing consumer demographics and consumption patterns would remain non-attributed to a particular consumer. i.e. the concerned supplier would know what true needs and wants were being expressed by the market, however he would not know who expressed those particular needs and wants.

First of the two paths to follow:
(i) present a consumer with products and services, and probable satisfaction weighting as per that consumers True consumption profile parameters. It is essential that this be executed without the concerned vendor knowing to whom the pertinent products and services were presented to;
(ii) allow the consumer to choose whether or not they wish to pursue the consumption experience;
(iii) present the consumer with a list of the best results, and weighting as per;

Second of the two paths to follow:
(i) log the vendor's resulting product/service profile within the central repository of industry products and services;
(ii) enable a consumer's True consumption profile to search the central product profile repository for a "best" to "least best" match. This "best" to "least best" match should be done according to an alignment with the requisite product/service parameters and that of the consumer's True consumption profile parameters:
(iii) present the consumer with a list of the "best" to "least best" match results, and weighting as per:
(iv) allow the consumer to choose whether or not they wish to pursue the consumption experience;
(v) update the consumer's True consumption behaviour profile repository according to the observed product selection and/or pursuant consumption behaviour.

BRIEF DESCRIPTION OF THE DRAWINGS

The present invention and its advantages will be more easily understood after reading the following non-restrictive description of preferred embodiments thereof, made with reference to the following drawings in which.

DESCRIPTION OF A REFERRED EMBODIMENT OF THE INVENTION

Figure 1:
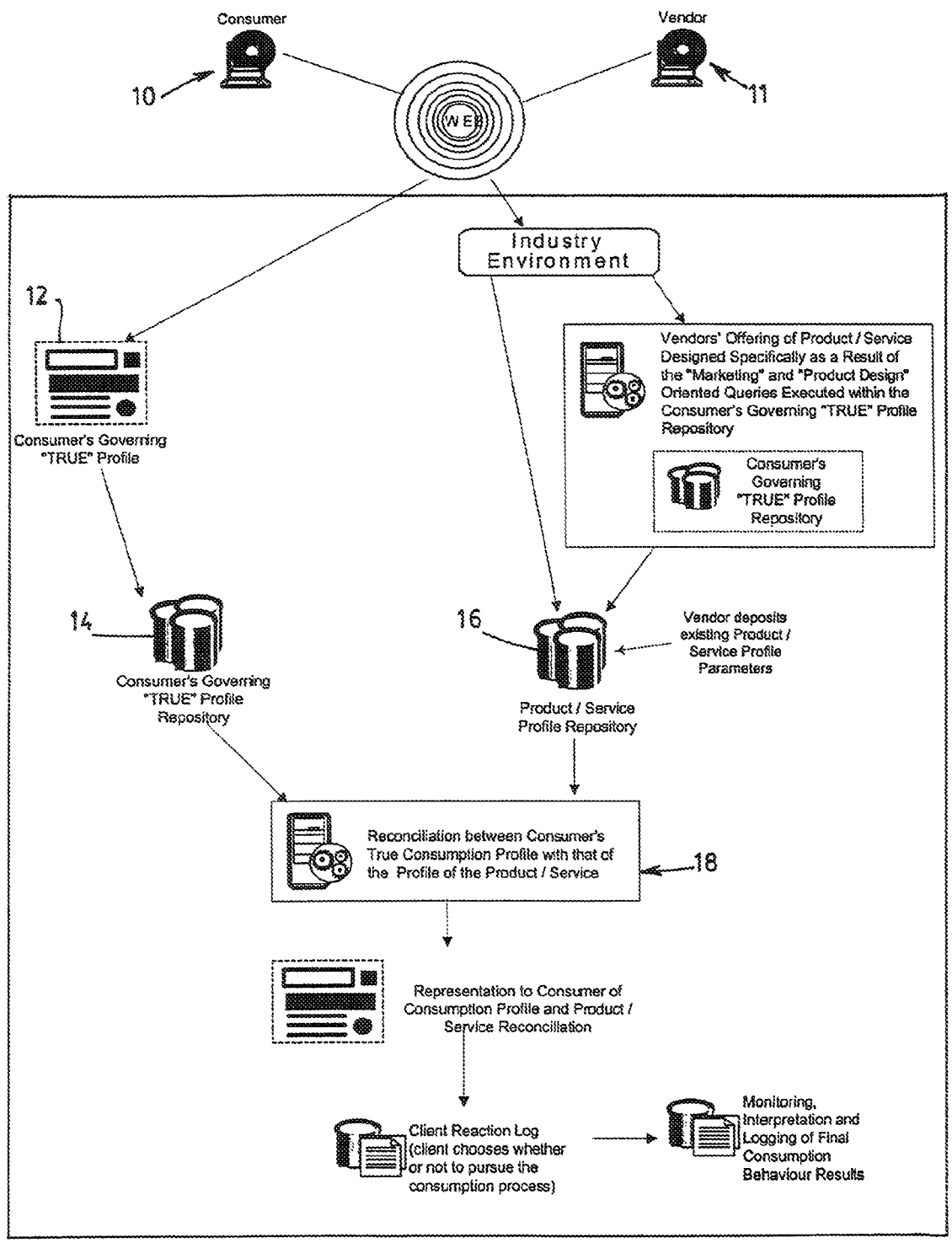
FIG. 1 is a schematic representation of the system according to a preferred embodiment of the present invention.

The present invention concerns a system and method for enabling a consumer to search for a product or service, all the while maintaining anonymity, according to a predefined consumption behaviour profile database. The system and method of the present invention will:
1. enable the concerned industry consumer, to search for products or services that best meet his true consumption behaviour profile requirements, all the while remaining hidden from the marketing department of the concerned vendor, and thus refraining from exposing information that he would otherwise prefer to remain confidential. This application of the consumer's True consumption behaviour profile database may best be described as the creation of an electronic version of a "Consumer's Guide";
2. enable providers of goods and services to query a fully secure and confidential consumer consumption database, in order to be able to determine what product and service designs would be most appealing to their potential target market, all the while not knowing which consumers had contributed to either the database or the query result(s) itself. All contributing consumer demographics and consumption patterns would remain non-attributed to a particular consumer. The interested supplier would know what needs and wants were being expressed by the market, however he would not know which specific consumer(s) expressed those particular (or possibly reconciled) needs and wants.

A fundamental aspect of the present invention is that the identity of the consumer remains private. It is the consumer's profile that executors an investigation within a centralised product database (hereinafter referred to as "product repository") containing the profiles of the goods and services potentially suited to meet the true "needs" and "wants" of the consumer. Consequently, a single potential offering, or a list of potential offerings, best meeting the consumer's requirements can be presented to the consumer. In a sense, this is the creation of an electronic "Consumer Guide" as referenced to the consumer's true consumption behaviour profile.

In a preferred embodiment of the present invention, a system for using a goods or services search engine in which the consumer's true consumption behaviour profile searches, within a product repository of profiled services and products, for products or services that best meet the consumer's requirements, all the while permitting the consumer to retain his anonymity in regard to the marketing department of the concerned vendor. In the context of the present invention, the consumer is uniquely identified by a true consumption behaviour profile, which is built and maintained current over time. In a preferred embodiment of the invention, the true consumption behaviour profile is established according to the teachings of co-pending application no. PCT/CA00/01529, the contents of which are incorporated by reference. If possible, it would also be advantageous to rely on a consumer's True consumption behaviour profile as determined and obtained from the reconciliation of several consumption behaviour profile patterns, retrieved from several True consumption behaviour pattern profile databases obtained from several industry/company consumer True profile repositories for that same consumer. The combination and reconciliation of these various consumption patterns, all be it for the same consumer, enables a wider scoped and more complete True consumption behaviour pattern for that said consumer.

The system includes a central (by way of several contributing firms and/or a consolidation of many firms) yet fully private database of consumer consumption patterns; a central product repository in which the profile of the product(s)/service(s) being made available (structurally and functionally designed to be industry relative) are registered; means for aligning the potential target product(s)/service(s) parameters with that of the concerned consumers true consumption profile parameters; means for a consumer's profile to investigate and identify the profile of industry participants/products/services that "best" meet that consumer's True consumption behaviour profile requirements; and means for confidentially presenting a consumer with the various suppliers/products/services available to him in order to "best" meet his true consumption behaviour parameters.

The method according to the present invention comprises the following steps:

(a) creating a central repository of consumer's true consumption profiles;
(b) creating a central repository for industry participants to register the profile of their products and services;
(c) searching the product repository for a "best" suited match as per an alignment with the requisite product/service parameters and that of the consumer's True consumption profile parameters; and
(d) presenting the consumer with a search-results list of "best" to "least best" match, and weighting as per.

In another aspect of the present invention, given that "marketing research" is the primary method on which providers of goods and services rely on in order to develop new and better suited offerings, the central yet fully private repository of consumer's true consumption profiles can be made accessible to vendors in order to support them in their product development and marketing research. Vendors would be able to query this secure and fully confidential consumer true consumption behaviour profile database in order to determine what possible product and service designs would be most appealing to their potential target market. It is essential to note that the concerned product vendors would have no ability of determining which consumers had contributed to either the database or to the query result(s) itself. All contributing consumer demographics and consumption patterns would remain non-attributed to a particular consumer. i.e. the concerned supplier would know what true needs and wants were being expressed by the market, however he would not know who expressed those particular needs and wants.

In such a case, the system and method of the present invention can be used in one of two ways.

Firstly, (i) present a consumer with products and services, and probable satisfaction weighting as per that consumer's True consumption profile parameters. It is essential that this is executed without the concerned vendor knowing to whom the pertinent products and services were presented to; (ii) allow the consumer to choose whether or not they wish to pursue the consumption experience; (iii) present the consumer with a list of the best results, and a weighting as per.

Secondly, (i) log the vendor's resulting product/service profile within the central repository of industry products and services; (ii) enable a consumer's True consumption profile to search the central product profile repository for a "best" to "least best" match. This "best" to "least best" match should be done according to an alignment with the requisite product/service parameters and that of the consumer's True consumption profile parameters; (iii) present the consumer with a list of the "best" to "least best" match results, and a weighting as per; (iv) allow the consumer to choose whether or not they wish to pursue the consumption experience; (v) update the consumer's True consumption behaviour profile repository according to the observed product selection and/or pursuant consumption behaviour.

Referring now to FIG. 1, the system of the present invention enables a more efficient connection between a consumer 10 and a vendor 11, all the while permitting the consumer 10 to remain anonymous.

The consumer 10 is uniquely identified by a consumer governing true profile 12. This profile is securely integrated into a repository 14 of consumer profiles.

The vendors 11 place their existing product and service profile parameters into a product/service profile repository 16.

Accordingly, if a consumer wishes to search for a particular product or service, the product/service profile repository is queried with the desired specifications, and a reconciliation is made between the consumer's true consumption profile with that of the profile of the product/service, and may even be weighted according to various criteria. The result of the query is presented to the consumer, who can decide or not to continue with the consumption process.

Figure 2:
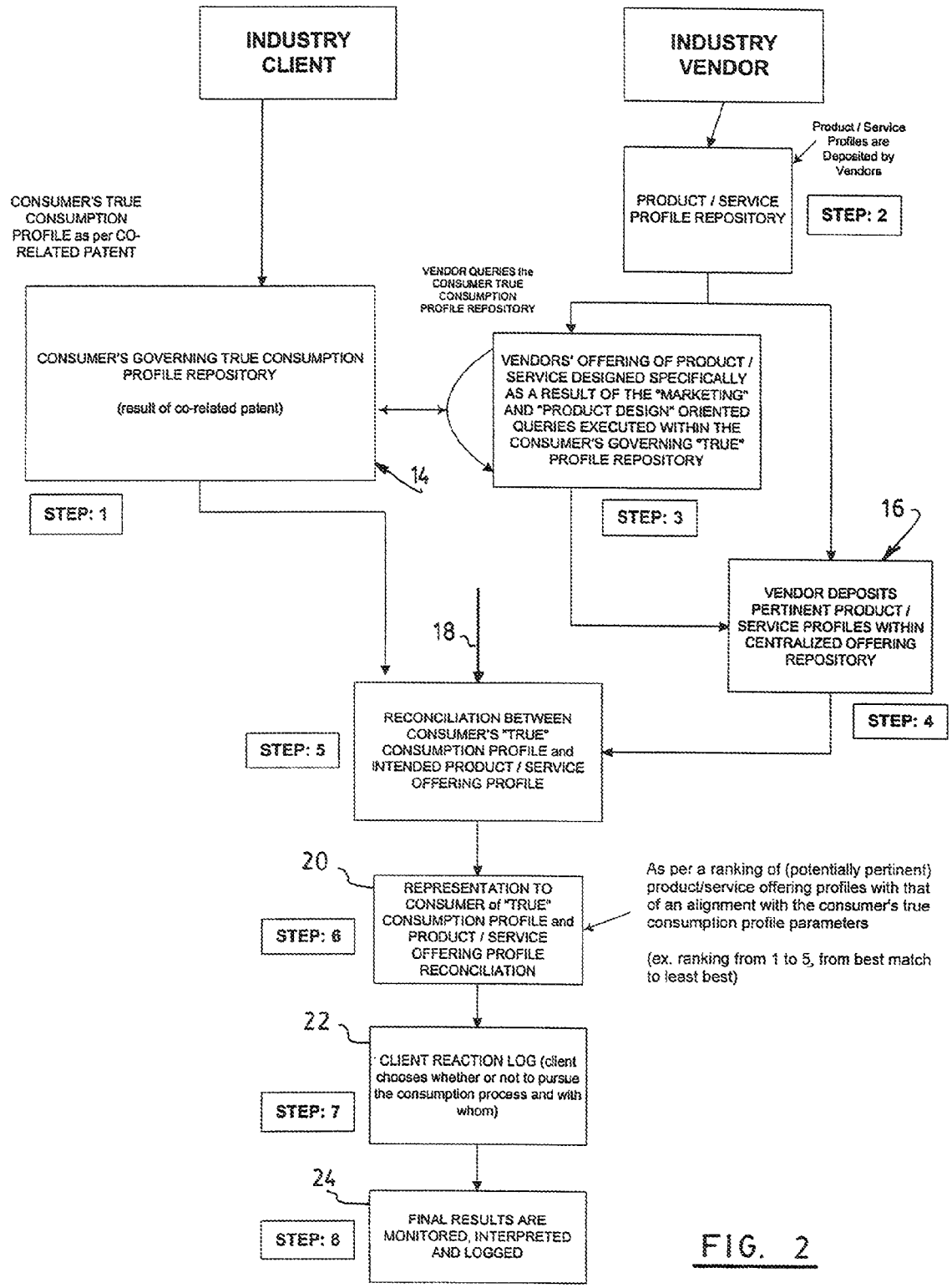
FIG. 2 is a schematic representation of the method according to a preferred embodiment of the present invention.

More specifically, and referring now to FIG. 2, the consumer, by means of his personal consumption profile file, residing within the true consumption behaviour profile repository, accesses a company's or an industry's general product/service profile database (hereinafter "the product repository"). This product repository (functionally designed to be industry relative) serves as a centralised database in which industry participants may register the profile of the product(s)/service(s) that they wish to make available to their target consumer market.

Upon the consumers true consumption behaviour profile accessing the industry specific product repository, a survey is done in order to identify which possibility(ies) of service or product offering(s) best suit the intended consumers true consumption behaviour profile. The range and depth of this survey should preferably be set according to pre-determined parameters as per the preferences of the vendor or the consumer.

The result of this search are preferably executed and represented as per a single result or as per a ranking of best to least best "match" between the consumer's true consumption behaviour profile parameters and that of the target product's/service's attributes. The gauge to be applied in establishing the best to least best range should preferably be left to the discretion of the consumer. This exercise may well serve to further identify the consumers true consumption profile.

As such, it is the consumer's true consumption behaviour profile that searches for products or services that "best" meet the specified parameters, all the while enabling the consumer as well as his true consumption behaviour profile to remain private. By enabling the consumer to maintain his anonymity, it is the suppliers of the intended targeted product(s) and service(s) that are being evaluated as to their suitability to meet the targeted consumer's needs, and not the consumer being evaluated as to his aligning with the profile of the product or service being proposed. The profile of the consumer remaining confidential, addresses and considerably alleviates privacy concerns. The consumer remains the sole owner of the profile, and is not flooded with unwanted promotions from companies that have purchased consumer lists that contain the customer's identity and consumption profile.

Upon the appropriate product or service having been identified, it is expected that the consumer will approach (physically or via an e-transaction) the concerned vendor in order to complete the transaction. In this case, however, anonymity is lost. This is not so crucial at this point, since the consumer knows exactly which item to purchase, and under which conditions.

Figure 3:
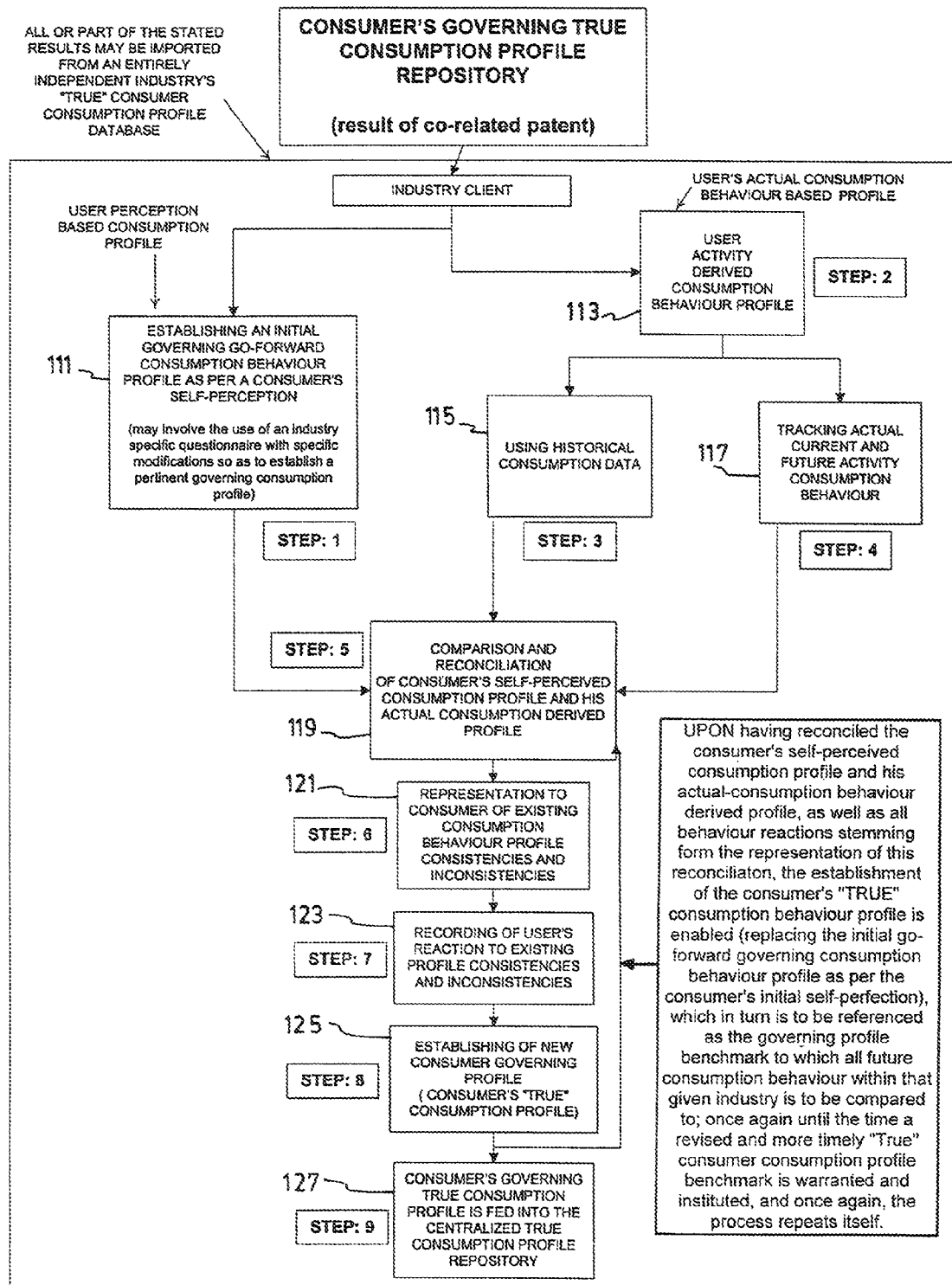
FIG. 3 is a schematic representation of the establishment of a consumer's governing profile and incorporation in a repository.

Referring now to FIG. 3, there is shown how an initial consumer profile is validated and updated in the consumption profile repository according to a preferred embodiment of the invention. At 111, the consumer establishes a perceived profile, usually by way of a questionnaire. At 113, 115 and 117, user activity is used to derive an actual profile, and at 119 a comparison is done between the self-perceived profile and the actual behaviour of the consumer and at 121, the consistencies and inconsistencies are presented to the user. At 123, the user's reaction is logged, and at 125, a new governing profile is created, which is then, at 127, fed into the repository.

It should be understood that the establishment of the governing profile as mentioned above is given according to the teachings of the co-pending application mentioned previously. However, other means for establishing a governing profile for a given consumer are within the scope of the present invention.

Figure 4:
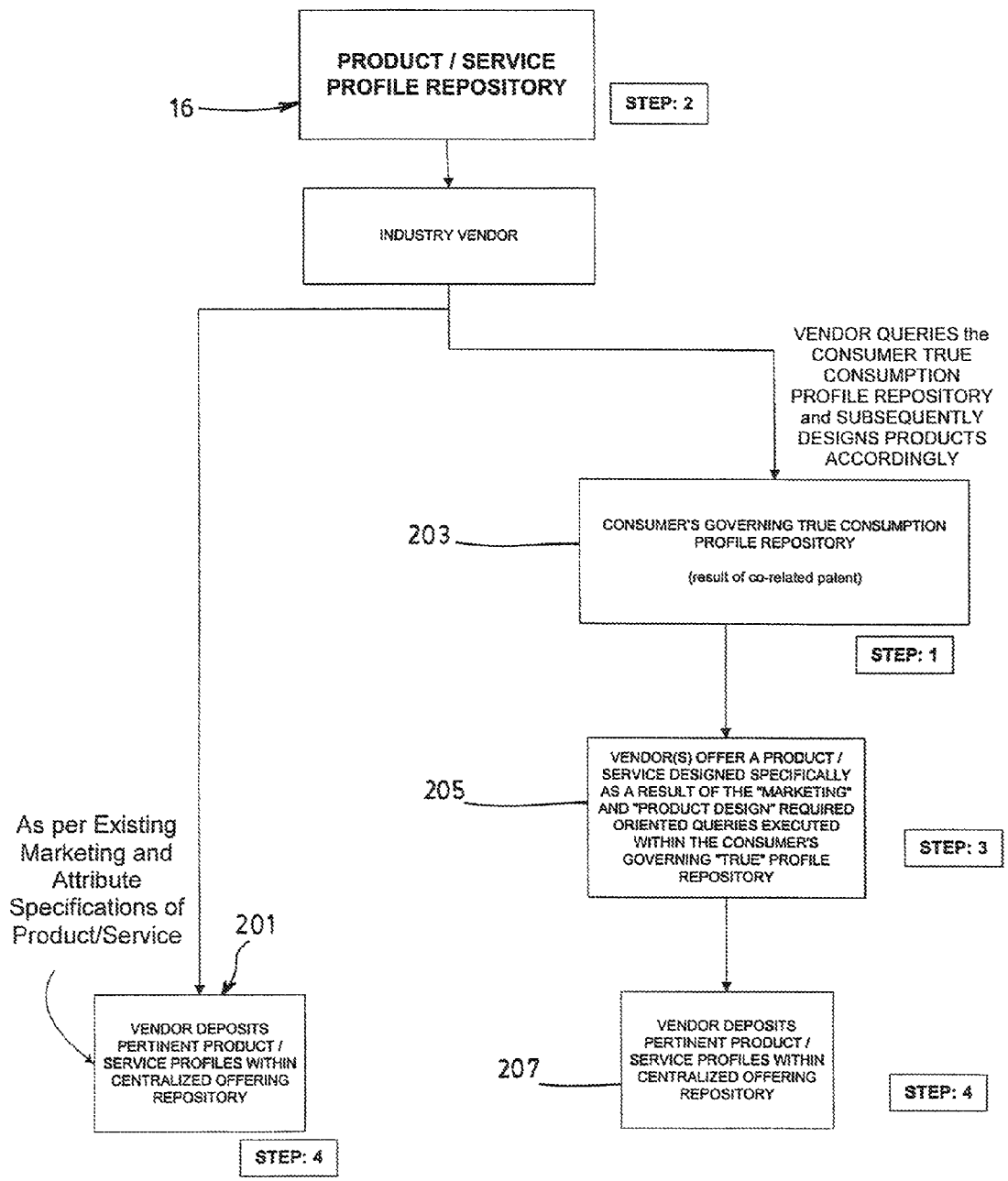
FIG. 4 is a schematic representation of the establishment of the product/service repository.

FIG. 4 shows the creation of the product/service profile repository. The vendor can either directly deposit relevant information into the repository at 201, or can use the consumer's governing true consumption profile repository 14 to offer a product or service specifically designed 205, and place this offering in the repository at 207.

Figure 5:
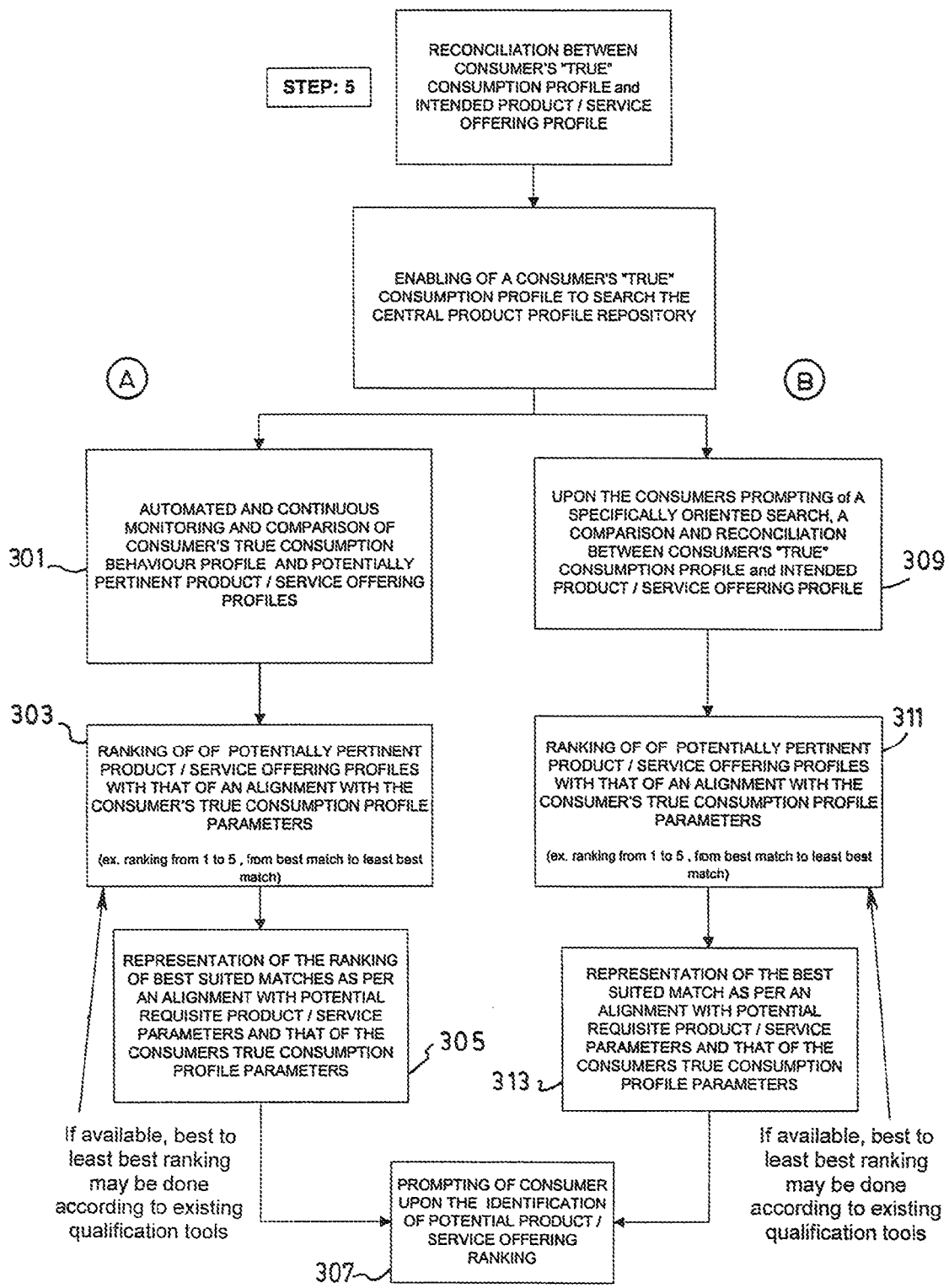
FIG. 5 is a schematic representation of the matching between the consumer's true consumption profile and the intended product/service.

FIG. 5 shows the manner in which the reconciliation is performed between the consumer's true consumption profile and the intended product/service offering profile.

Such a comparison can be made automatically (A), or upon a specific prompt (B) initiated by the consumer.

If automatic, the profile and offerings are continuously monitored 301 and ranked 303, and a representation of the ranking of best suited matches are presented to the consumer, and the consumer may be asked to choose, or otherwise identify the product/service selected.

If the consumer prompts the comparison, the steps are similar as above, i.e a ranking is performed 311 and a representation is made to the consumer 313.

Figure 6:
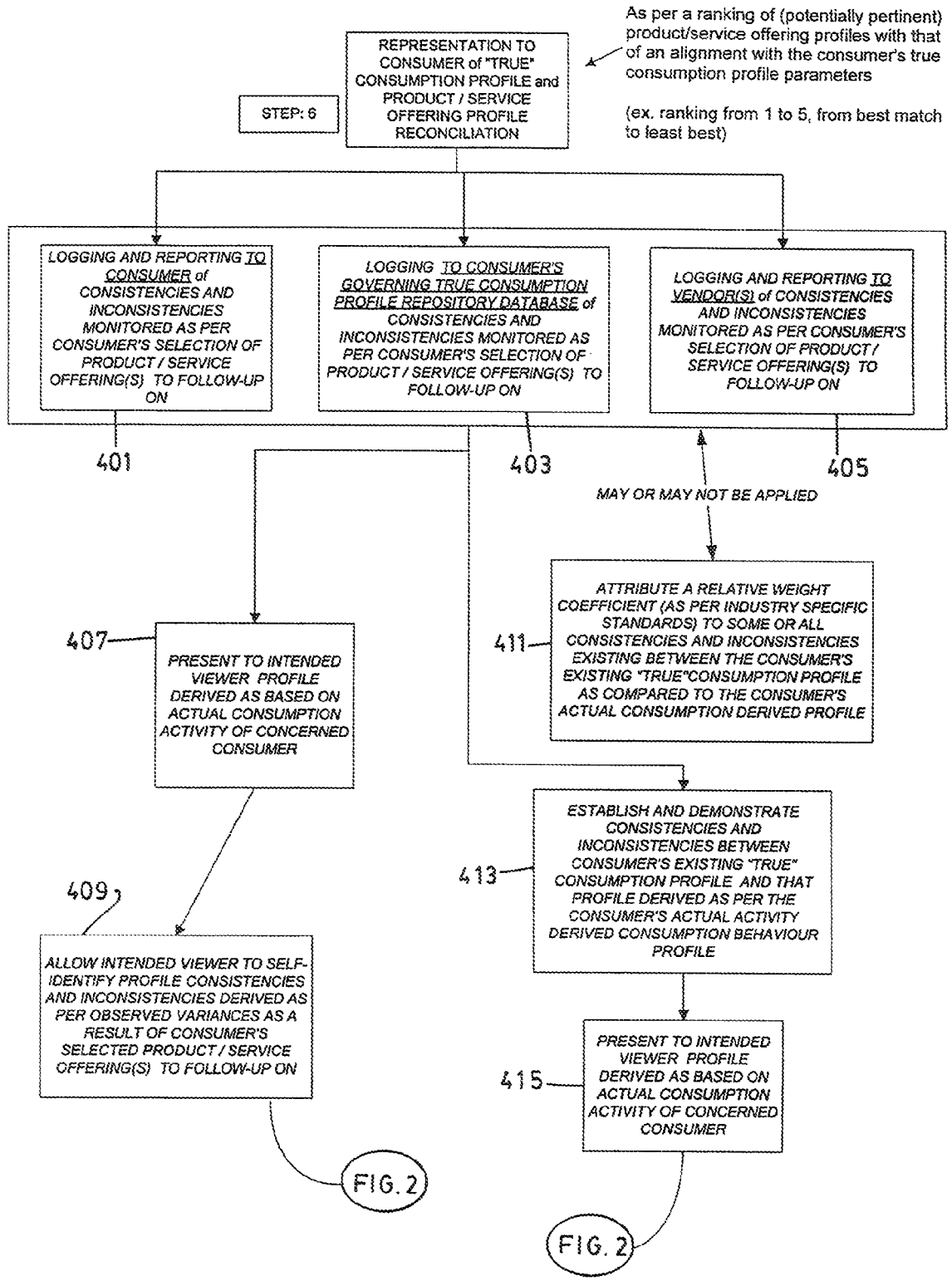
FIG. 6 is a schematic representation of the reconciliation between the consumer profile and the product/service offering.

FIG. 6 shows the supplemental steps in reconciling the consumer profile with the product/service offering. This step is optional, but may be used to further validate the consumer profile residing in the repository.

The consistencies and inconsistencies between the reconciliation and the actual behaviour of the consumer can be logged and reported to the consumer 401, to the repository 403 or to the vendors 405, or a combination thereof. In all cases, the consistencies and inconsistencies are presented to the intended viewer profile 407 and the viewer is allowed to self-identify consistencies and inconsistencies 409, or alternatively, at 413, the consistencies and inconsistencies are demonstrated between the consumption profile and the actual activity derived profile, and are then presented to the viewer for further analysis.

Figure 7:
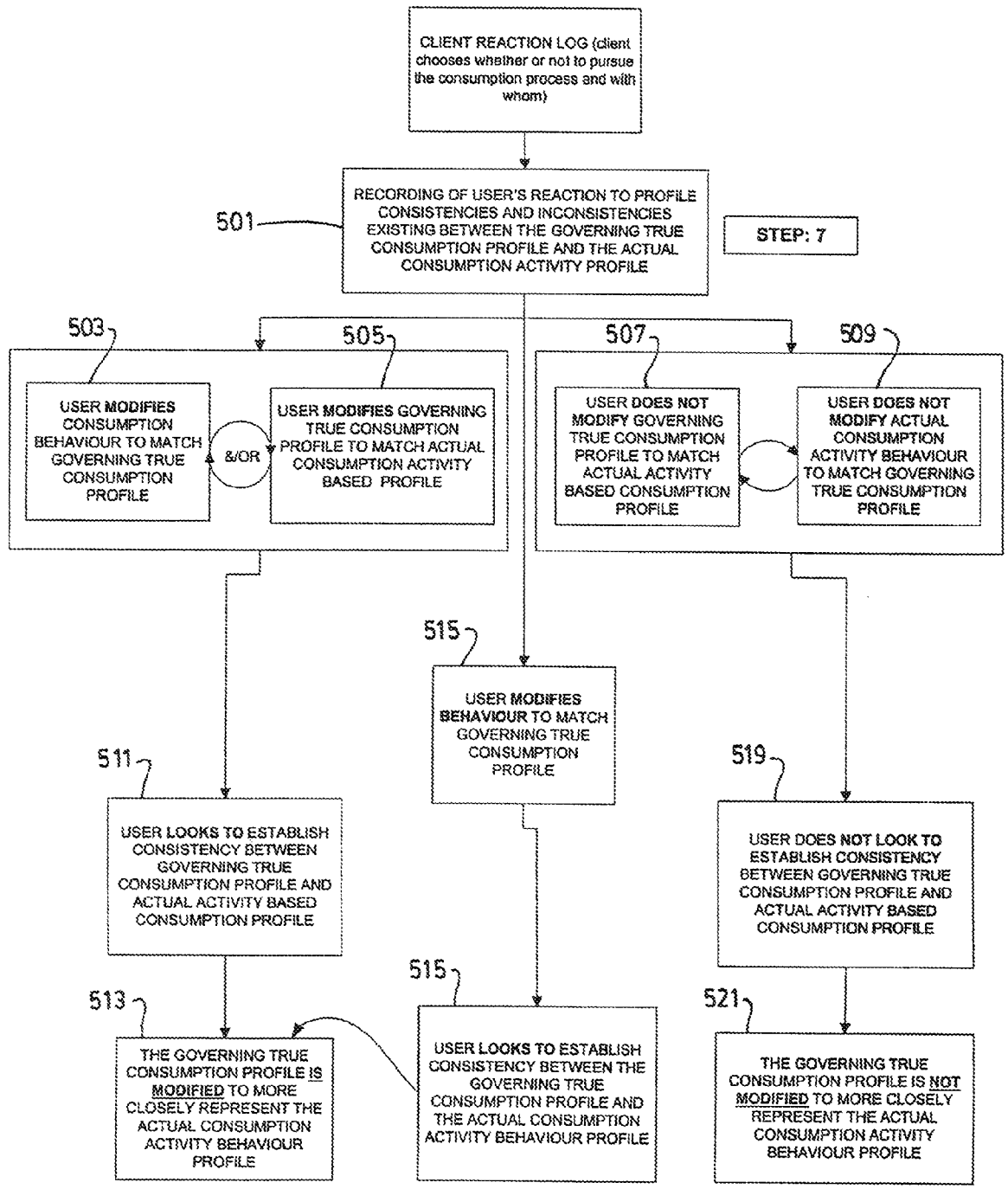
FIG. 7 is a schematic representation of the building of a client reaction log.
Figure 8:
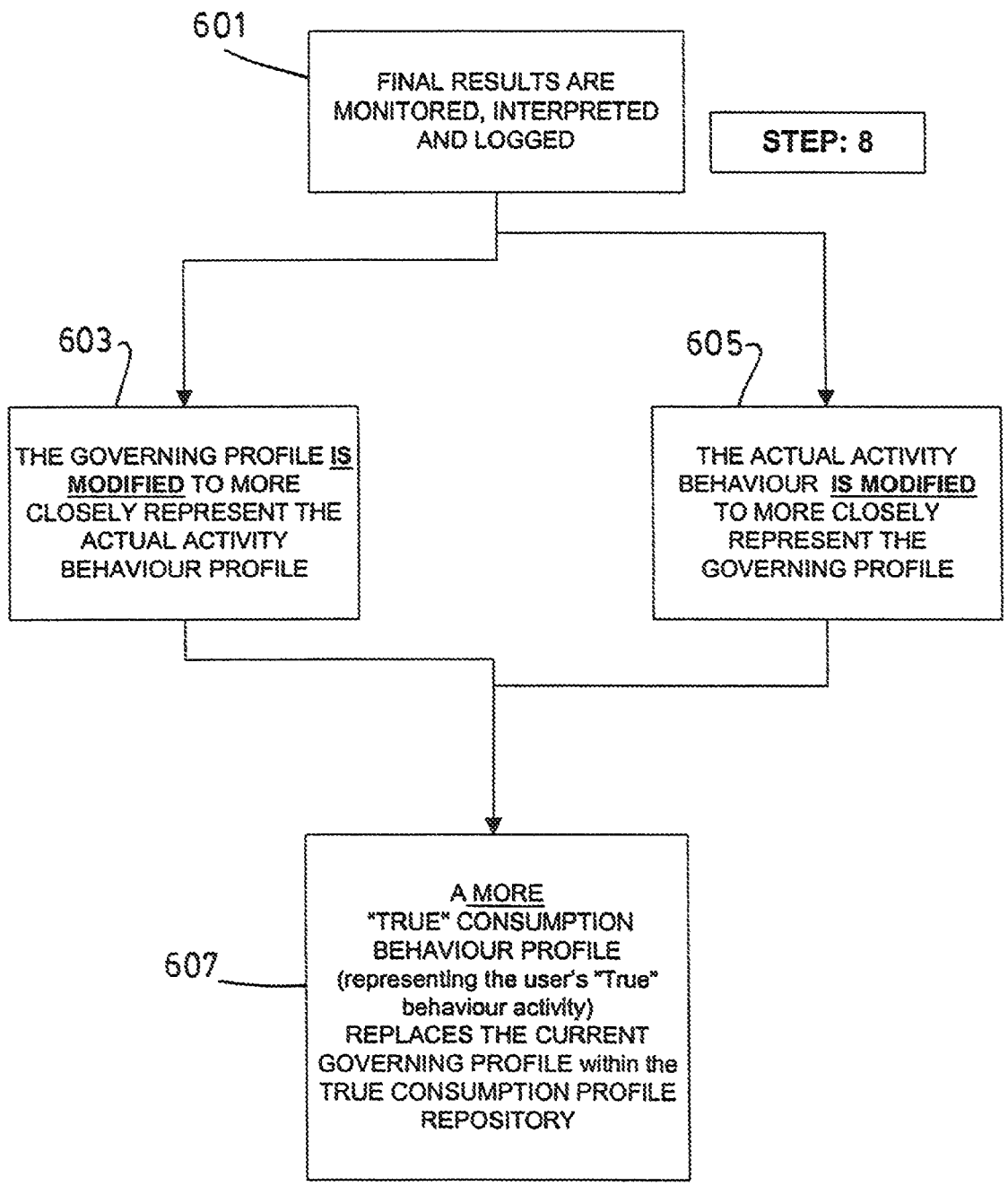
FIG. 8 is a schematic representation of the modification of the consumer profile.

Afterwards, in order to further validate the governing consumer profile, the steps appearing in FIG. 7 can be performed, identically to the steps outlined in the co-pending application.

Finally, the results of the reconciliation are monitored, interpreted and logged 601, and either the governing profile is modified 603 or the actual activity of the consumer is modified 605, all to establish a better true consumption behaviour profile, which will be updated in the repository.

Alternately, and as mentioned above, the consumer's governing true consumption profile repository can be used to help vendors anonymously perform market research. To that end, a central consumer true consumption behaviour profile repository must be created. This repository's configuration can be: a physically centralised repository being fed by many smaller "tributary-like" consumer's true consumption behaviour profile databases or a network of interconnected localised consumer's true consumption behaviour profile databases.

These examples in do not exclude the use of any other methods. Other potential configurations may exist, and/or a combination of several configurations may be judged to be the best. These decisions will be greatly dependent on the marketing and research objectives at hand. The ultimate configuration to be implemented will greatly depend on the willingness to participate of the concerned consumers as well as the actual vendor owner's of the "tributary-like" customer true consumption profile databases.

The vendor by means of accessing the consumer's true consumption behaviour profile repository (however the configuration may be in that particular instance), may execute certain queries in order to determine what his target customer's true consumption profiles are indicating are their true needs and wants. It is clear that the queries should be as per the querying vendor's self-determined requirements, and that the best conceived queries should in a matter of fact render the most useful and pertinent of results. It also goes without saying that no query with the potential of identifying one or several of the contributing consumer's to the true consumption profile repository will be authorised. This identification protection measure may also be extended to the vendor owner's of the "tributary-like" customer true consumption profile databases.

An example of queries may be:

Percentage of target consumer's indicating similar needs and wants;

Demographic structure of resulting true consumption profile targeted segment;

Identification of true consumption profile trends;

Inclusion of consumer's physical and sub-conscious needs and wants in the design and marketing of a product;

Data detailing consistencies and inconsistencies existing between a consumers self stated consumption profile and his actual true consumption behaviour based profile;

Simulated test marketing within consumer profile repository in order to determine expected target consumer reaction.

Upon a vendor having identified what he believes is information that could aid him in developing a truly target offering to a certain market niche, and upon designing and building this new offering, a promotional plan may be implemented. Other than the existing means of promoting a product, this resulting offering may be promoted to consumers by several other means reliant on the existence of the proposed "product repository":

A vendor may choose to simply register his new offering's profile within the previously described product repository;

If authorised by potential target customers to be made aware of all potentially suited products meeting their true consumption profiles, these consumers may be promoted to (this may be done directly, or most probably will still entail the consumer to remain anonymous to the concerned vendor).

The same could be said for the vendor owner's of the "tributary-like" customer true consumption profile databases. These parties may see a commercial value in promoting newly targeted offerings to their existing clients, and thus commercial alliances may be created as a result. Once again this may be done directly, or most probably will still entail the consumer to remain anonymous to the concerned vendor(s). However it may also be that the anonymity feature of this patent may even go as far as concealing the identity of the vendor owner's of the "tributary-like" customer true consumption profile databases.

The extent to which target customers and vendor owner's of the "tributary-like" customer true consumption profile databases are disclosed and/or directly promoted to will certainly be greatly dependant on their expressed willingness. Certain parameters may be included in the consumer's profile repository indicating each consumer's, as well as the vendor owner's of the concerned repository willingness and extent to which they wish to be solicited.

The vendor of the newly targeted offering may in turn further evaluate the success of his new product by analysing the response of his target market. And may as such bring further modifications or fully promote the product as such.

By means of the repository and the establishment of business alliances and promotions, it may be conceived that the vendor of the newly targeted offering may establish programs compensating a sampling of target consumers to evaluate the new offering. Once again subject to the acceptance of the concerned parties. i.e. the extent of marketing and promotional tools available to vendors remains virtually unlimited, other than the newly introduced circumstance that with the use of the system and method according to the present invention, the consumer retains the ability to remain anonymous throughout the consumption experience.

EXAMPLES

The following is an example of the determination of a True consumption profile according to a preferred embodiment of the present invention, for an investment product selection.
A) Responses to Questionnaire

| | |
|---|---|
| 1. What is the Minimum ROI you require/expect? | 10% |
| 2. What is the Maximum RISK you can tolerate? | 5% |
| 3. What is the time horizon of an investment/portfolio? | 5 years |
| 4. Who is your preferred reference? | Analysts |
| 5. What are your investment objectives for a portfolio/investment? | Retirement |

These responses would indicate a <<conservative>> investment stance.
B) Actual Behaviour Pattern

| | |
|---|---|
| 1. What is the Minimum ROI that is actively participated in? | 17% |
| 2. What is the Maximum RISK that is actually tolerated? | 9% |
| 3. What is the time horizon of an investment/portfolio that is actually maintained? | 6 months |
| 4. Who is the actual preferred reference? | My brother |
| 5. What are the actual investment objectives for a portfolio/investment as determined by the investor's behaviour? | Growth |

The actual investor behaviour would indicate a <<growth>> investment stance.
C) Resulting "True" Investor Profile

| | |
|---|---|
| 1. What is the Minimum ROI that is actually sought out? | 17% |
| 2. What is the Maximum risk that is actually tolerated? | 9% |
| 3. What is the actual maintained time horizon of an investment/portfolio? | 6 months |
| 4. Who is the actual preferred reference? | family |
| 5. What are the actual investment objectives for a portfolio/investment as determined by the review of the investor's actual investment behaviour? | Growth |

The "TRUE" investor profile may indicate a balanced investment stance with validation from close and trusted sources. Quick turn-around and volatility is acceptable, yet this need to be well managed, however may ultimately deter an initial investment decision. As such, the investor's True investment profile would investigate the available security masters (an investment inventory repository) in order to identify which investment would best suite his True investment profile. Assuming a suited investment opportunity (or a ranking of suited investment opportunities) is identified the investor would selected the investment opportunity that they wish to partake in, independent of the sales tactics of aggressive brokers.

The second example, below, illustrates the determination of a consumer's true consumption profile for a vehicle product selection.
A) Family Profile
   A young family
   2 kids
   conservative image
   middle income means
   enjoys road trips
   comfort is important
   he enjoys sailing
   she enjoys mountain biking
   live in warm weather zone
It could be demonstrated that this family's profile could be met via several dozen Sports Utility Vehicle options. An investigation within an SUV profile repository may greatly save the family time, delays in meeting their True needs and wants, and possibly most important, the avoidance of pushy car salespeople.
B) Resulting Identification of an SUV with the Following Attributes:
   1. seats 6 comfortably
   2. car like ride
   3. $35,000.00 base, $42,000.00 fully loaded
   4. includes in-vehicle video system
   5. rear seats are fold away
   6. low gear capacity for towing The omission of any of the above stated customer profile attributes may well lead to an incomplete and possibly inappropriate consumer True consumption profile to be established and referenced. It can also be argued that the omission of any of the above stated profile parameters could lead to a different vehicle selection for this family. However, the reconciled ensemble of this family's profile determinants makes for an increased satisfaction and poignant vehicle selection.

By enabling the consumer's True profile (the greater the detail, the better) to navigate the potential vehicle repository (ies), a selection most suited in depth and width may be aligned to the family. All the while avoiding all of the aggravation associated with investigating a new vehicle purchase.

As stated above, the present invention may also be used by vendors to design products and services to actual consumers' needs as opposed to marketing specifications.
The next example illustrates this type of embodiment.
A) surveyed vacationer profiles
   65% prefer to try different foods
   73% prefer their time to be spent combining relaxing beach-time and demanding sports activities 55% prefer salt water pools
19% attend organised evening activities
47% would play tennis if available in-doors, although very hot weather in common
Etc. . . .

As a result build and market the complex accordingly.

Although the present invention has been explained hereinabove by way of a preferred embodiment thereof, it should be pointed out that any modifications to this preferred embodiment within the scope of the appended claims is not deemed to alter or change the nature and scope of the present invention.

The invention claimed is:

1. A computer implemented method for anonymously matching consumption objects with a consumer's consumption behaviour, said consumer being uniquely identified by a true behaviour derived consumption profile, said method comprising the steps of:
 (a) creating a central repository of consumer's true objective behaviour derived and feedback derived consumption profiles;
 (b) creating a least one central product repository, containing consumption object profiles for a plurality of consumption objects, each of said at least one central product repository being associated with a given industry, wherein industry participants register profile of their products and services within said product repository, each said at least one central product repository containing only entry profiles of items registered;
 (c) electronically searching the product repository for at least one match between parameters of a consumption object profile and parameters of the consumer's true consumption profile;
 (d) presenting the consumer with a list of best to worst matches so that said industry participant cannot identify said consumer, each said at least one best-matched consumption object being presented to said consumer, on a computer screen connected to a computer, along with a probable satisfaction weighting obtained through said true consumption profile;
 (e) providing an interface, on the computer screen connected to the computer, for said user to select one or more of said at least one best-matched consumption object; and
 (f) upon said user selecting one or more of said at least one best-matched consumption object, electronically updating said true consumption profile with information relating to said selection.

* * * * *